(12) United States Patent
Van Noten et al.

(10) Patent No.: US 8,414,200 B2
(45) Date of Patent: Apr. 9, 2013

(54) DEVICE FOR INSTALLING AN OPTICAL FIBRE IN A SPLICE CONNECTOR

(75) Inventors: Lodewijk Van Noten, Leuven (BE); Jan Vandenbroeck, Aarschot (BE); Jan Watte, Grimbergen (BE); Jozef Versleegers, Bree (BE); Jan Muller, Bladel (NL)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 10/578,239

(22) PCT Filed: Oct. 27, 2004

(86) PCT No.: PCT/GB2004/004528
§ 371 (c)(1),
(2), (4) Date: Jan. 8, 2009

(87) PCT Pub. No.: WO2005/052661
PCT Pub. Date: Jun. 9, 2005

(65) Prior Publication Data
US 2009/0180742 A1    Jul. 16, 2009

(30) Foreign Application Priority Data

Nov. 4, 2003 (GB) .................................. 0325697.1
Nov. 22, 2003 (GB) .................................. 0327233.3

(51) Int. Cl.
*G02B 6/255* (2006.01)
*G02B 6/00* (2006.01)

(52) U.S. Cl.
USPC .............................. 385/97; 385/135; 385/137

(58) Field of Classification Search ............... 385/95–99, 385/135–137
See application file for complete search history.

(56) References Cited

U.S. PATENT DOCUMENTS

| 4,727,742 | A | | 3/1988 | Weaver | |
|---|---|---|---|---|---|
| 5,999,682 | A | * | 12/1999 | Vincent et al. | ................. 385/134 |
| 6,190,054 | B1 | * | 2/2001 | Tamaki et al. | ................... 385/53 |

FOREIGN PATENT DOCUMENTS

| EP | 0 810 455 A1 | | 12/1997 |
|---|---|---|---|
| EP | 0 874 253 B1 | | 11/2001 |
| EP | 0 846 965 B1 | | 3/2002 |
| EP | 0 810 455 B1 | | 8/2005 |
| GB | 2 034 069 A | | 5/1980 |
| GB | 2034069 | * | 5/1980 |
| JP | 60-134209 | | 7/1985 |
| WO | WO 98/54608 | | 12/1998 |

OTHER PUBLICATIONS

Shah, V et al. "Cleaved Oblique Fiber End Faces for High-Performance Mechanical Splices", Proceedings of the Optical Fiber Communication Conference, San Diego, Feb. 18-22, 1991, New York, IEEE, US, vol. CONF. 14, Feb. 18, 1991, p. 111, XP000270396, ISBN: 1-55752-166-2.

* cited by examiner

*Primary Examiner* — Uyen Chau N Le
*Assistant Examiner* — Michael Mooney
(74) *Attorney, Agent, or Firm* — Faegre Baker Daniels LLP

(57) ABSTRACT

A device for installing an optical fiber in a connector, comprising an optical fiber cleaving mechanism (51), a connector holding means and a fiber insertion mechanism (55) arranged such that an optical fiber may be cleaved by the cleaving mechanism to produce an end of the fiber, and the end of the fiber may be inserted by means of the insertion mechanism into a connector (1) held by the connector holding means (53).

37 Claims, 10 Drawing Sheets

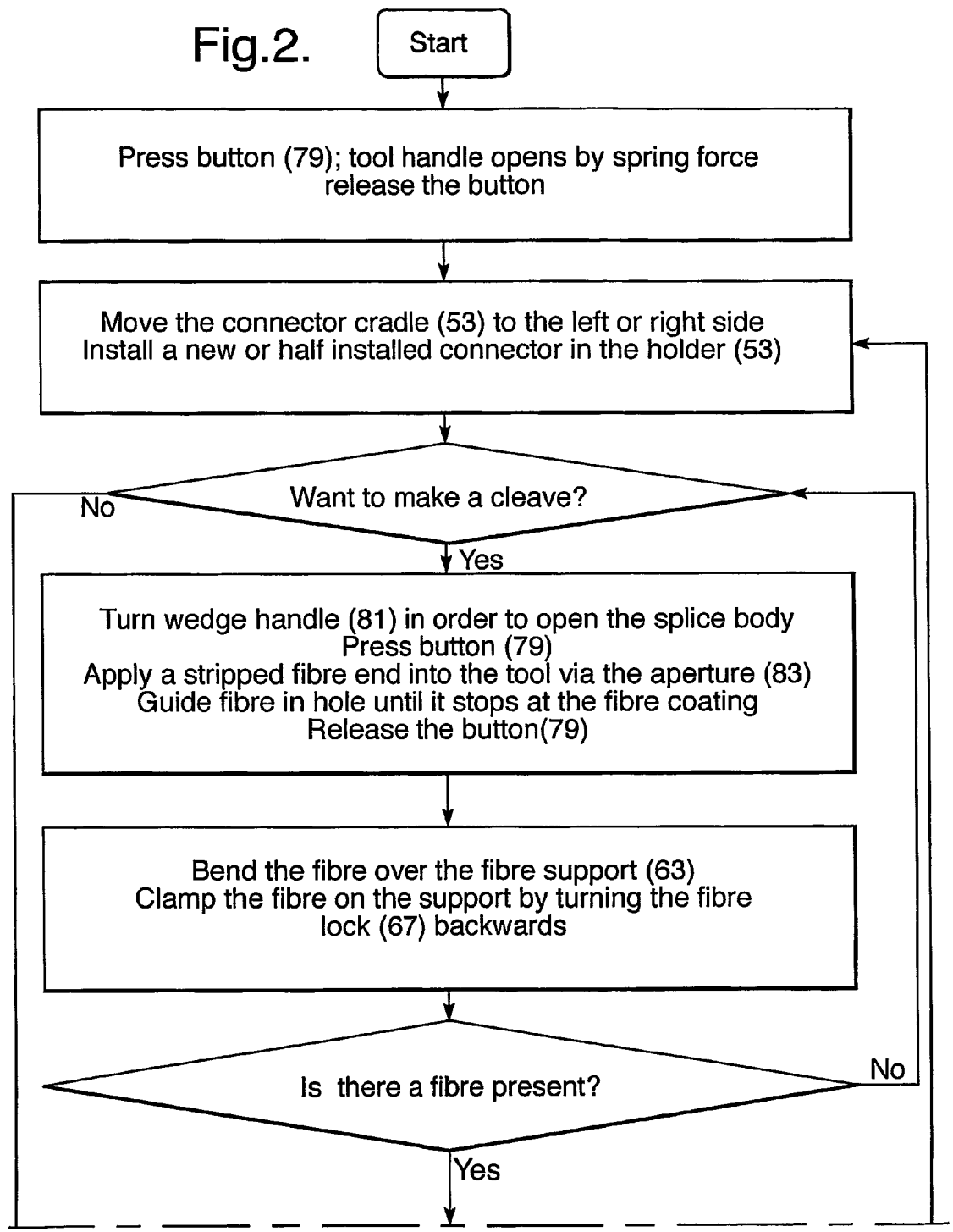

Fig.6.
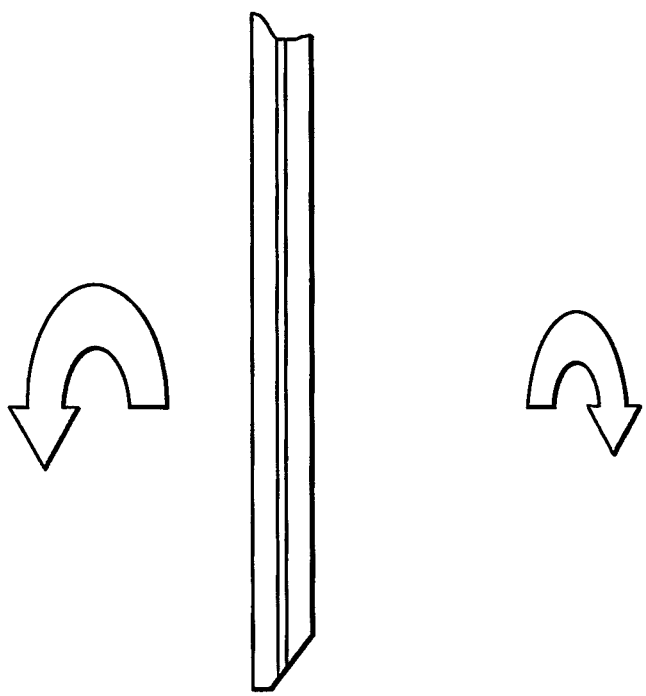
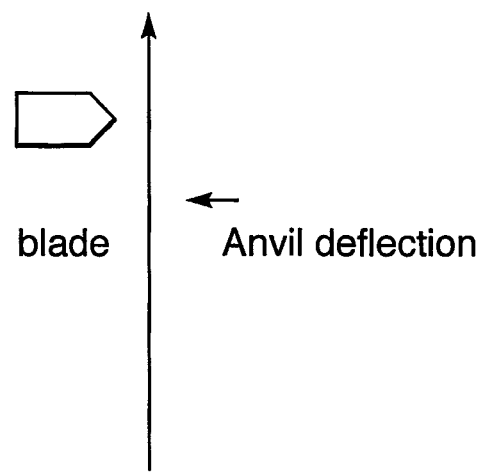
blade | ← Anvil deflection
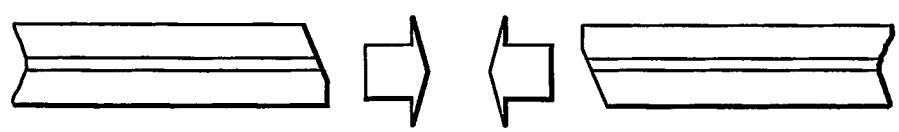

Fig.9.
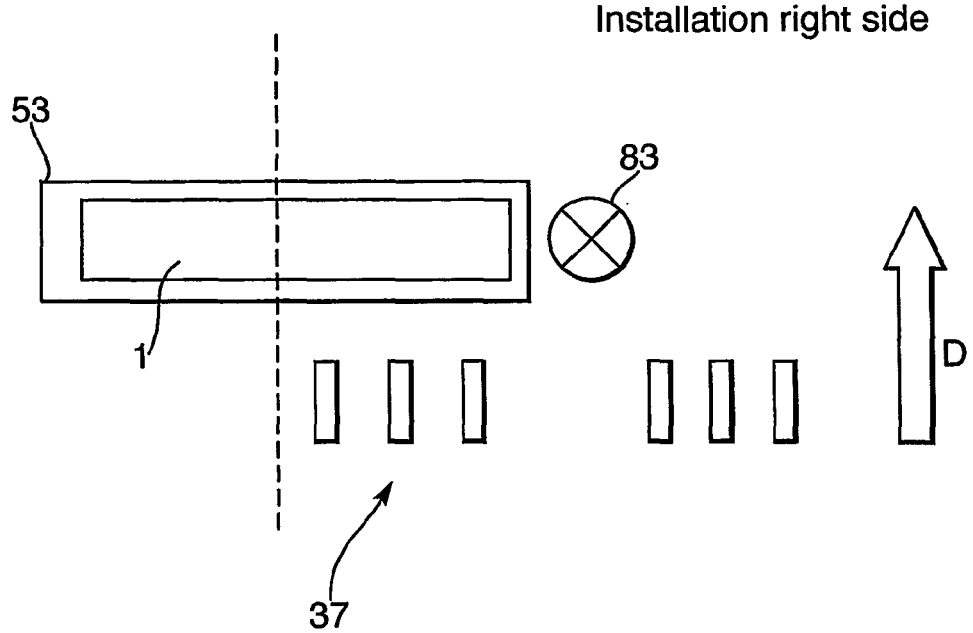
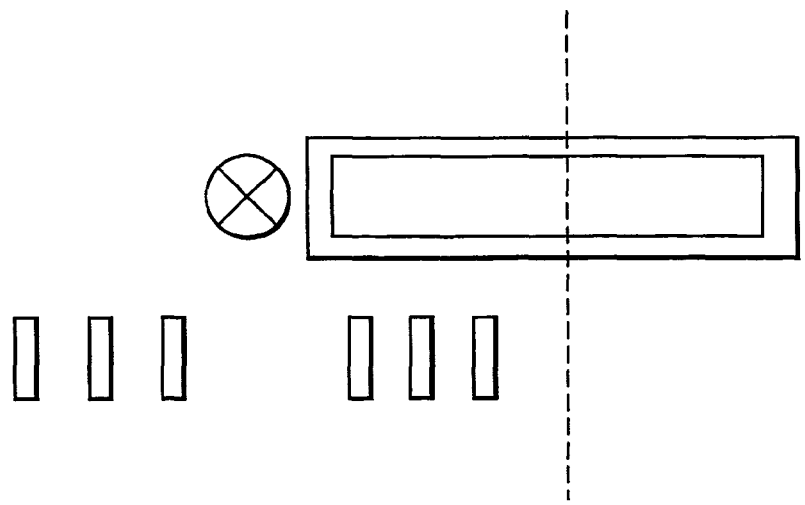

DEVICE FOR INSTALLING AN OPTICAL FIBRE IN A SPLICE CONNECTOR

The present invention relates to a device for installing an optical fibre in an optical fibre connector, and in particular such a device in the form of a hand-held tool.

When splicing optical fibres mechanically, by means of an optical fibre connector, it is generally necessary to prepare the end faces of the fibres to ensure that a satisfactory splice, having low optical losses, is formed. This may, for example, involve producing an angled end face of each fibre, i.e. an end face that is not perpendicular to the longitudinal axis of the fibre. Angling the end face of a fibre has the advantage of minimizing undesirable reflections of light back along the fibre from the end face (which "back reflections" might otherwise disrupt optical communications along the fibre). A splice formed between two fibres having angled end faces which are oppositely oriented with respect to each other such that the end faces are in intimate contact with each other is therefore generally desirable, since such a splice will normally have low optical losses and minimal back reflections associated with it.

International Patent Application WO 98/54608 discloses a tool for the angled cleaving of optical fibres. The tool cleaves an optical fibre by clamping the fibre under tension by means of two clamping blocks, displacing the fibre between the clamping blocks by means of an anvil so that the displaced part of the fibre experiences a localised shear force, and scoring the fibre. Because the scored part of the fire is under both tension and shear, the fibre cleaves at an angle away from the perpendicular to the fibre axis. The cleaving tool may be used to cleave an optical fibre that has a ferrule attached to it prior to the insertion of the fibre into the tool. In addition, for polarisation-maintaining (PM) optical fibres, a ferrule that has been pre-attached to such a fibre may be placed in the cleaving tool in a fixed orientation so that the angle of cleave is in the correct orientation with respect to the polarisation axis of the PM optical fibre.

Despite the above-described advantages of splicing optical fibres with angled end faces, such splices have the drawback that their correct formation is generally a skill and time-consuming operation, requiring the expertise of a skilled technician. Also, because the formation of such splices is dependent upon the skill of the technician, the quality of such splices can be variable.

The present invention seeks to simplify the making of mechanical splices, particularly splices formed between fibres with angled end faces, while ensuring their consistent quality. Especially, the invention seeks to avoid the need for a high level of human skill in forming such splices, and by so doing to improve the consistency of the splices so formed.

Accordingly, the invention provides a device for installing an optical fibre in a connector, comprising:

an optical fibre cleaving mechanism;
a connector holding means; and
a fibre insertion mechanism;

arranged such that an optical fibre may be cleaved by the cleaving mechanism to produce an end of the fibre, and the end of the fibre may be inserted by means of the insertion mechanism into a connector held by the connector holding means.

Because the device includes not only a cleaving mechanism to produce a prepared end of a fibre (e.g. suitable for splicing with another fibre), but also a fibre insertion mechanism for inserting the prepared end of the fibre into a connector held by a holding means of the device, the device avoids the requirement for a high level of skill and judgement for these operations on the part of the operator of the device. Consequently, the device can provide high degrees of consistency and quality in the preparation of large numbers of optical fibre splices. The device preferably is a hand operated tool.

For the avoidance of doubt, the term "insertion" (with regard to a fibre being inserted into a connector) as used in this specification, is intended to include insertion into a connector, or otherwise placing a fibre in or on a connector such that the fibre is installed in the connector (or will be installed in the connector merely by subsequent securing of the fibre in the connector, e.g. by clamping).

A second aspect of the invention provides the use of an installation device according to the first aspect of the invention, to install an optical fibre in an optical fibre connector.

The connector preferably comprises at least two parts between which the optical fibre is inserted by the insertion mechanism of the device. The parts of the connector preferably are opened by wedge members of the installation device, thereby enabling the insertion of the optical fibre into the connector. Advantageously, the connector, and the wedge members and the connector holding means of the device, may be arranged such that the wedge members open only a portion of the connector at a time, to install an optical fibre in that portion of the connector while leaving another portion of the connector unopened. This enables an optical fibre to be installed in the connector without disturbing the installation of a fibre already installed in the connector, for example.

Preferred and optional features of the invention are described below, and in the dependent claims.

In order to aid the understanding of the invention, some preferred embodiments of the invention will now be described, by way of example, with reference to the accompanying drawings, of which:

FIG. 6 is a schematic illustration of the formation of an optical fibre splice by means of a device according to the invention;

Figure 8:
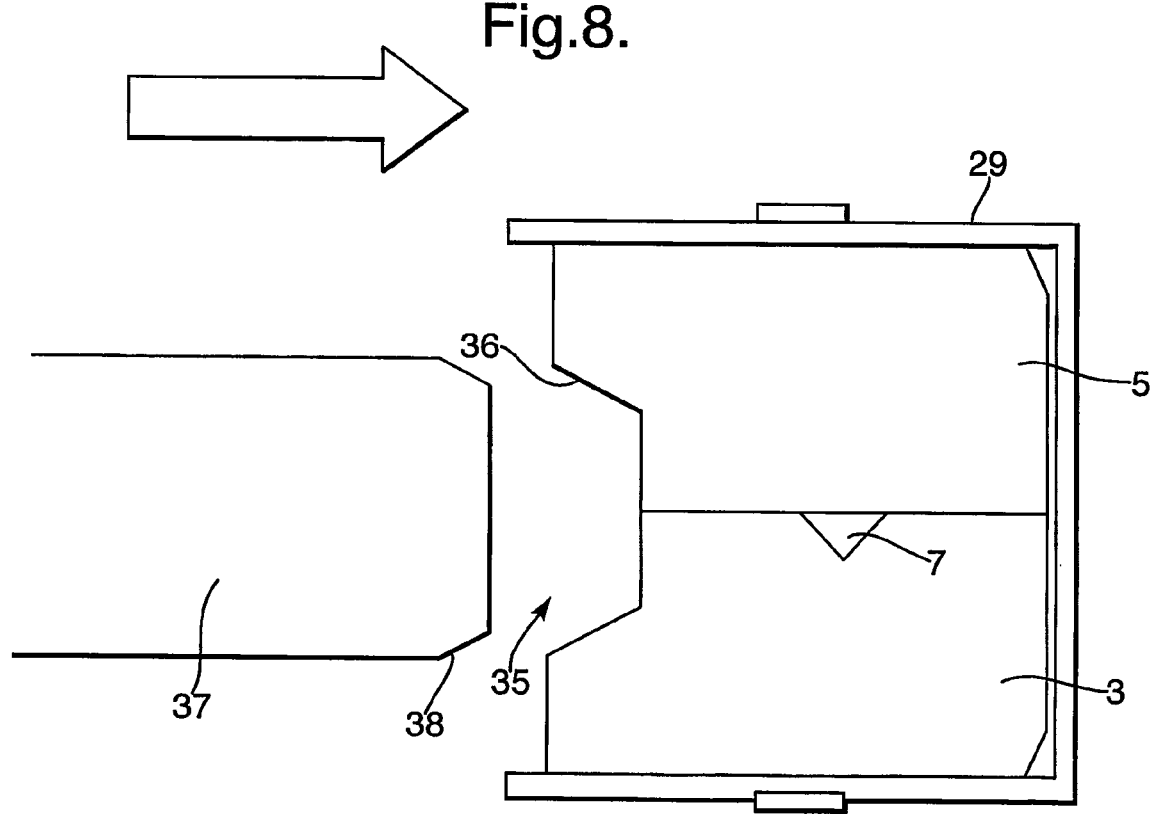

FIG. 8 is a schematic illustration of so-called "wedge-opening" of a connector by means of a device according to the invention; and FIG. 9 is a schematic illustration of the wedge-opening of FIG. 8, illustrating how a selected half of a connector may be opened by means of wedge members of the device according to the invention, in order to install an optical fibre into that half of the connector without disturbing the other half of the connector.

Figure 1:
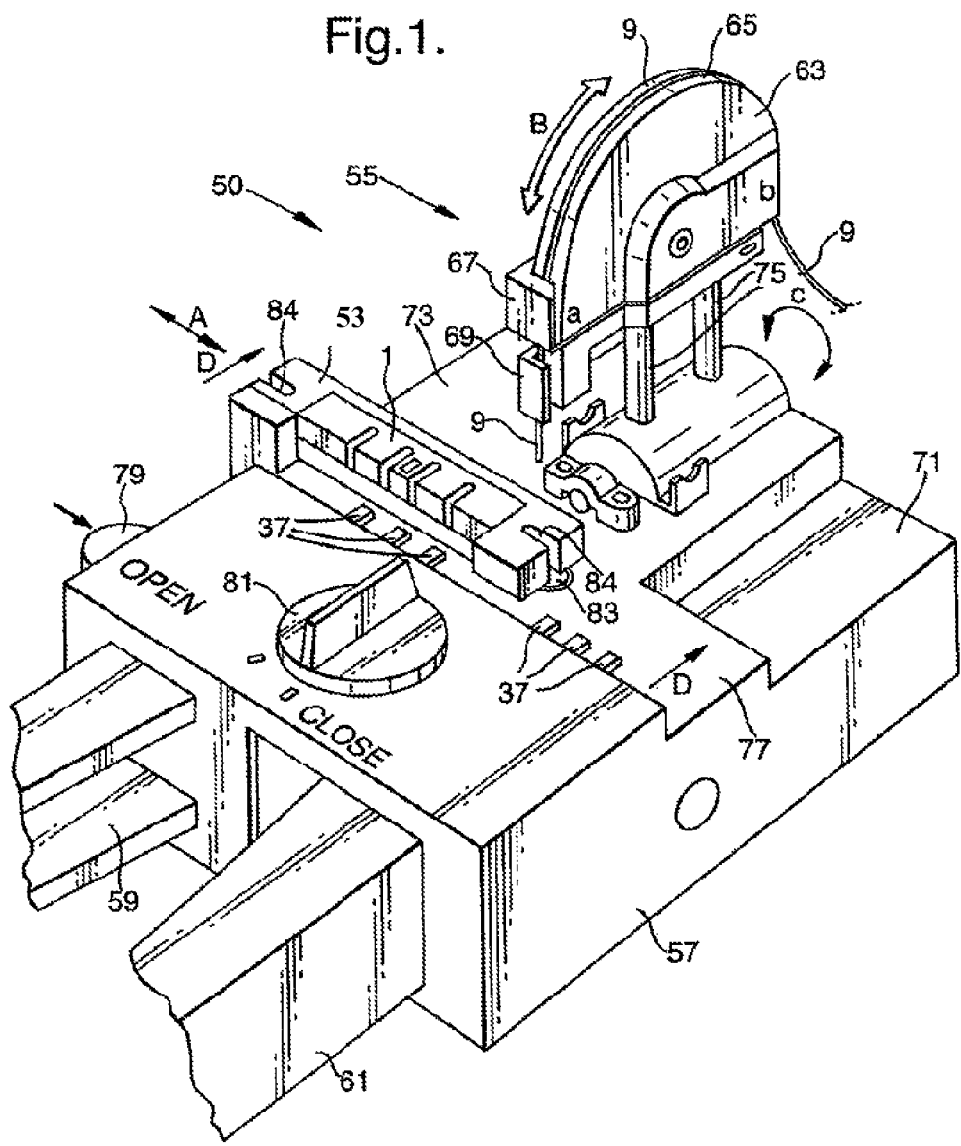
FIG. 1 is an illustration showing the main components of an embodiment of a device according to the invention.

FIG. 1 shows an embodiment of a device 50 according to the invention, for installing an optical fibre in an optical fibre connector. The device 50 comprises an optical fibre cleaving mechanism 51 (not shown in FIG. 1, but shown in FIGS. 3 and 4), a connector holding means 53, and a fibre insertion mechanism 55. The components of the device 50 are part of a main body 57 of the device. The device 50 is in the form of a hand-held tool, which in addition to the main body 57 includes handles 59 and 61.

Figure 7:
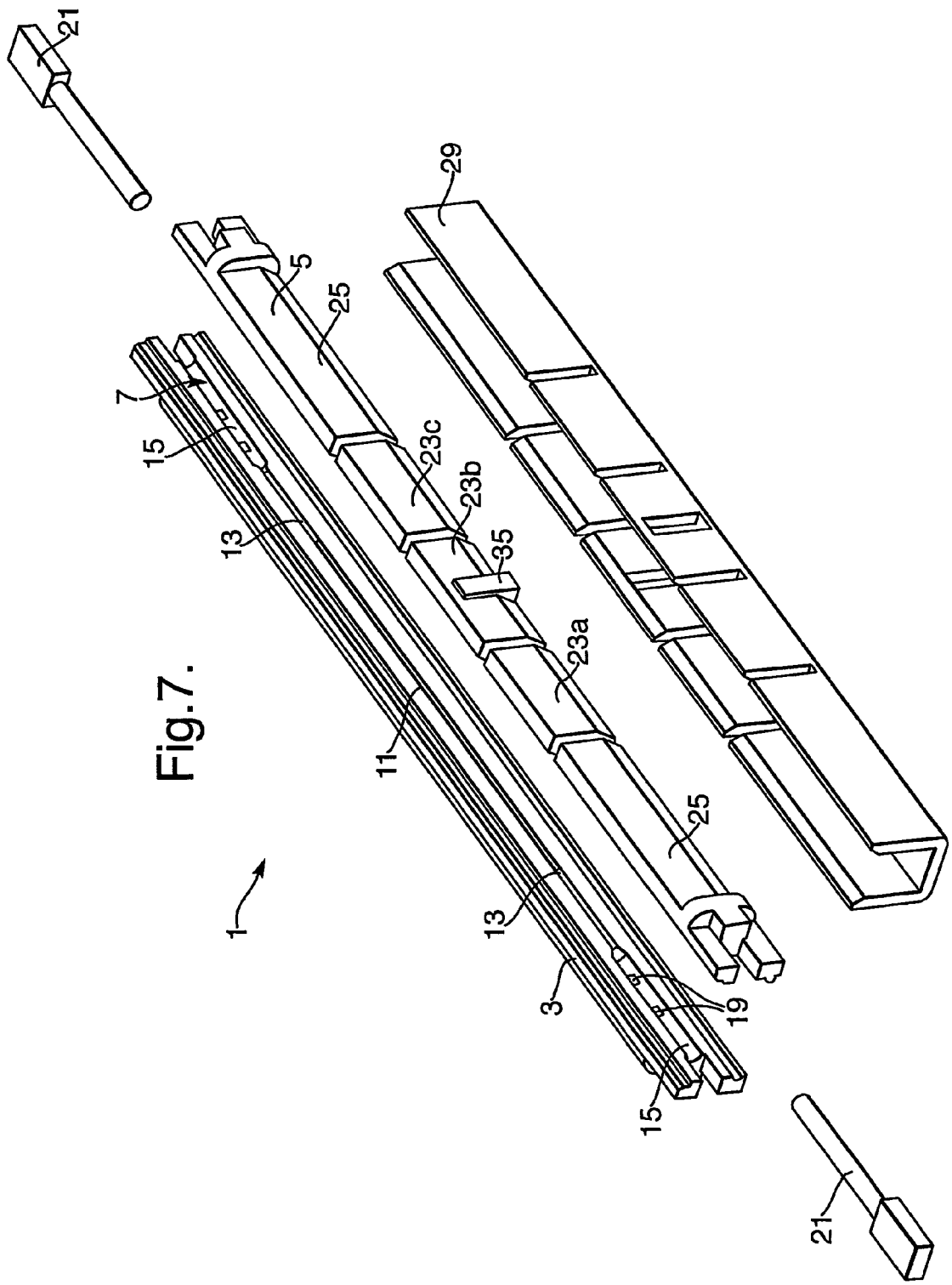
FIG. 7 is an illustration of an embodiment of an optical fibre connector for use with a device according to the invention.

The cleaving mechanism 51 will be described below with reference to FIGS. 3 and 4. The connector holding means 53 has the general form of a cradle for an optical fibre connector 1. A preferred form of connector for use with the device 50 is as shown in FIGS. 7 and 8, which are taken from the applicant's co-pending UK Patent Application No. 0325697.1, the entire disclosure of which is incorporated herein by reference. The cradle 53 (carrying a connector 1) is arranged to slide from one side to the other across the main body 57 of the device, as indicated by double-headed allow A. When the cradle and connector are positioned on one side of the device an optical fibre may be installed in one side of the connector, and when the cradle and connector are positioned on the other side of the device another optical fibre may be installed in the other side of the connector. In this way, two optical fibres may be installed in a connector to form a splice, or alternatively a single fibre (only) may be installed in a connector, ready for splicing with another fibre at a subsequent time.

The optical fibre insertion mechanism 55 is a mechanism by which an optical fibre may be held and manipulated. The embodiment of the insertion mechanism 55 shown in FIG. 1 comprises a support 63 for an optical fibre, in the general form of a half disc having a groove 65 in which a fibre may be retained. The groove 65 is deeper on one side (marked "a") of the circumference of the half disc support 63 than it is on the opposite side (marked "b") of the circumference of the support, and the depth of the groove decreases gradually from point a to point b around the circumference. This enables an optical fibre to be clamped (or "locked") on the support 63 by means of a rotating fibre lock 67 situated on the circumference of the half disc support 63, which pivots about a radial centre point 69 such that the fibre lock follows the circumference of the support as it rotates between point a and point b, as indicated by double-headed arrow B. When the fibre lock 67 is at point a, a fibre located in groove 65 is not clamped by the fibre lock, but the fibre lock clamps the fibre in the groove when the fibre lock is at point b. The insertion mechanism 55 also includes a further clamp 69 for an optical fibre located in groove 65. When the fibre lock 67 is at point b, the further clamp 69 also clamps the fibre.

The support 63 of the insertion mechanism 55 is movable with respect to the main body 57 of the device, and is therefore able to manipulate an optical fibre clamped to it. In particular, the support 63 is able to rotate as indicated by double-headed arrow C between an upright orientation with respect to the main body 57, as drawn in FIG. 1, and two opposite "flat" orientations with respect to the main body. In a first flat orientation, the support 63 has been rotated to the right as drawn in FIG. 1, such that part of the support 63 is nestled in a recess 71 of the main body. In an opposite, second, flat orientation, part of the support 63 is nestled in another recess 73 of the main body, situated on the opposite side of the support. In addition to such rotational movements of the support 63, the support is also able to move linearly along shafts 75 towards and away from the main body 57. This linear movement of the support enables an optical fibre held by the support to be moved linearly in a plane parallel to a main surface 77 of the main body 57 into an optical fibre connector held by the cradle 53, as described below.

Having briefly described some of the main features of the device of FIG. 1, a preferred optical fibre connector for use with the device will now be described.

FIG. 7 illustrates the components of a preferred optical fibre connector; The connector 1 comprises a connector body comprising two parts 3 and 5 which divide the connector body in two along the length of the connector body. The two parts 3 and 5 may be regarded as half-shells of the connector body. The first part 3 will be designated as a base part 3, and the second part 5 will be designated as a lid part 5. Each of the parts 3 and 5 includes a longitudinal channel which, when the parts are brought together to close the connector body define a longitudinal bore 7 extending through the connector body. The bore 7 is for accommodating optical fibres 9 spliced in the connector in use.

The bore 7 comprises a longitudinally central first region 11, second regions 13 at each end of the first region 11, and third regions 15 at each end of the second region 13 (opposite to the ends adjacent to the first region 11). Each second region 13 has a greater diameter than the first region 11, and each third region 15 has a greater diameter than its adjacent second region 13. The first region 11 of the bore 7 is dimensioned to accommodate bare optical fibre stripped of coatings in a tight clamping fit when the lid part 5 and the base part 3 of the connector body are clamped tightly together. The bare optical fibre preferably has an external diameter of approximately 125 µm. The second and third regions of the bore 7 are each dimensioned to accommodate coated regions of the optical fibre. Two such regions (i.e. the second and third regions) of differing diameters are provided so that the connector can accommodate two different sizes of coated fibres (i.e. fibres of different coating thicknesses). It is generally preferred for the second region to be dimensioned to accommodate coated fibre having a diameter of 250 µm, and for the third region to be dimensioned to accommodate coated fibre having a diameter of 900 µm. (Other dimensions could, however, be used.) Whichever size of optical fibre is used, an end portion of the fibre has its coating stripped back to expose the bare fibre, which is accommodated in the first region, and the coated portion is accommodated in the second or third region.

One of the parts of the connector body, preferably the base part 3, includes a semicircular cross-section channel as its portion of the first region 11 of the bore. The other part of the connector body, preferably the lid part 5, is substantially flat in its first region, other than small recesses which help to guide and retain the fibres in position. The fact that the first region of the bore is not circular in cross-section but includes a flat section helps to clamp the bare fibre tightly in the first region. The second and third regions, however, are substantially circular in cross-section. One or both of the second and third regions may include one or more retaining members 19 arranged to cut into the respective coating of the optical fibre to provide axial pull resistance, especially in order to counter creep which might otherwise occur over time.

The connector may include plugs 21 arranged to close, and preferably to seal, the ends of the bore 7 prior to, and during, installation of the optical fibre splice. The plugs 21 preferably prevent dust or other dirt ingress into the connector, and preferably also prevent water ingress into the connector, which could have a detrimental effect on the integrity of the splice. The plugs are removable from the bore to enable the optical fibres to be inserted.

As shown in FIG. 7, at least one of the parts of the connector body, preferably the lid part 5, is divided into a plurality of sections 23 and 25. The sections 23 and 25 are clamping sections of the connector body. As illustrated, there are five clamping sections, comprising three main clamping sections 23 arranged to clamp directly onto the bare optical fibre in the first region 11 of the bore 7, and two additional clamping sections 25 arranged to clamp directly onto the coated portions of the optical fibres in the second or third regions of the bore 7.

The connector also includes a resilient clamp member 29 in the form of a generally U cross-section resilient metal member that is configured to be retained on the exterior of the connector body. The resilient clamp member 29 is arranged to retain the lid part 5 and the base part 3 together such that they are tightly clamped around the spliced optical fibres in use. The two generally parallel arms of the resilient clamp member are divided into clamping sections which form part of the respective clamping sections 23 and 25 of the connector body. The clamping sections of the resilient clamp member enable the clamping sections 23 and 25 of the connector to clamp the fibres independently of each other. A longitudinally central clamping section of the resilient clamp member 29 includes an aperture arranged to receive a protrusion 35 on the connector body to retain the clamp member in place on the connector body.

Because the connector body and the resilient clamp member include three separate main clamping sections arranged to coincide with the first region 11 of the bore 7, the stripped bare portions of two optical fibres spliced in the connector may be clamped independently of each other. Specifically, a first main clamping section 23a clamps only a first bare optical fibre, a second main clamping section 23b clamps both of the first and second bare optical fibres, and a third main clamping section 23c clamps only the second bare optical fibre. Consequently, a first optical fibre may be installed in the connector in preparation for splicing with a second optical fibre to be installed in the connector at a later time. As described below, the end face of the first optical fibre preferably is cleaved at a non-perpendicular angle with respect to the longitudinal axis of the fibre, in order to minimise back reflections. As a way of facilitating the splicing of the first fibre to a second fibre (also having a non-perpendicular end face) it is preferable to determine and to retain the orientation of the end face of the first fibre in the connector. The fact that the second fibre can be introduced into the connector body and spliced with the first fibre without requiring the unclamping of the first main clamping section 23a from the first fibre means that the orientation of the first fibre is retained.

FIG. 8 is a schematic cross-sectional diagram of the assembled connector showing how the lid and base parts 3 and 5 may be separated slightly to facilitate the insertion of the optical fibres to be spliced. The lid and base parts 3 and 5 together provide a recess 35 on the open side of the resilient clamp member 29. The recess 35 has inclined side walls 36. When wedge members 37 of the device 50 are inserted into the recess 35, inclined side walls 38 of the wedge members 37 co-operate with side walls 36 of the recess to force the lid and base parts apart to a predetermined amount. This facilitates axial insertion of the optical fibre(s) into the bore 7. The wedge members 37 are adapted to be able to open the lid and base parts selectively in individual clamping sections of the connector, as described below.

Figure 2:
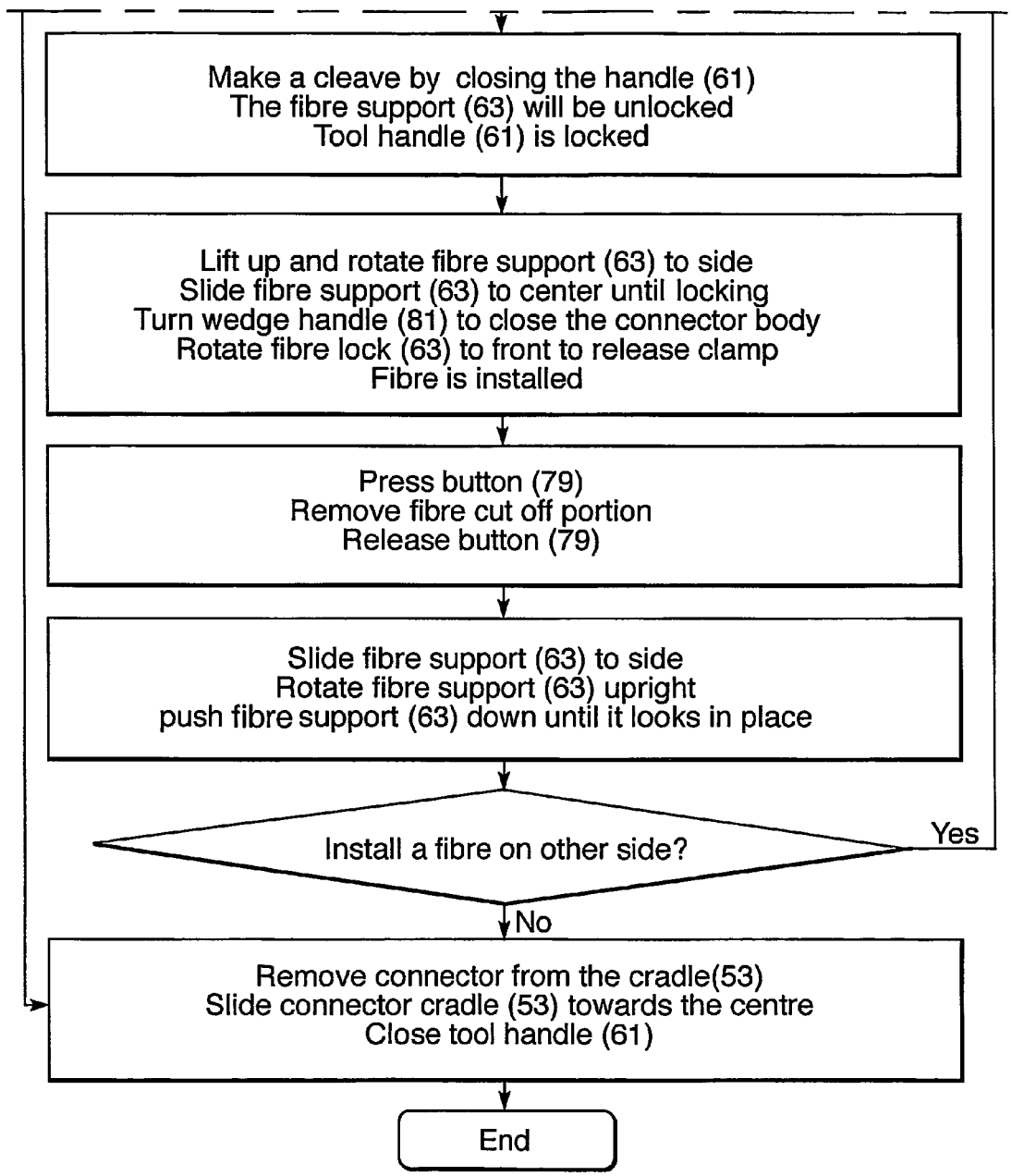
FIG. 2 is a flow chart summarising the main steps in using the device of FIG. 1.

Having described some of the main components of the device 50 of FIG. 1 and the connector of FIGS. 7 and 8, the remainder of the device and the functioning of the device will now be described with reference to the flow chart of FIG. 2, the device of FIG. 1, and the other drawing figures.

In order to use the device 50 to install an optical fibre into a connector (to form a splice with a pre-installed fibre or to install a fibre ready for forming a splice with another fibre to be installed subsequently) a button 79 on the main body 57 of the device is first pressed, which causes handle 61 to open (i.e. to rotate away from handle 59), or at least ensures that the handle 61 is open. The button 79 is then released. The connector holding means 53 (i.e. the cradle) is then moved to either the left or the right side of the main surface 77 of the main body, depending upon the side of the connector in which a fibre is to be installed. If a fibre is to be installed in the right hand side of a connector 1 as drawn in FIG. 1, the cradle 53 is moved to the left hand side of the device as drawn, and vice versa.

A connector 1 is inserted into the cradle 53 such that the dividing plane between the two parts 3 and 5 of the connector is generally parallel to the main surface 77 of the main body of the device 50, and such that the U-shaped resilient clamp member 29 has its open side facing away from the insertion mechanism 55 and towards the wedge members 37 of the device. A wedge handle 81 is then turned to an "open" position, which causes the wedge members 37 to be inserted (as indicated by arrow D) between the parts 3 and 5 of the connector (as described above) in the relevant half of the connector to enable an optical fibre to be inserted axially into that half of the connector at a later stage in the installation procedure (described below). As drawn in FIG. 1, the cradle 53 (holding a connector 1) is positioned on the left hand side of the main surface 77, to enable an optical fibre to be installed in the right hand side of the connector 1. The relative positions of the cradle 53, connector 1, wedge members 37 and aperture 83 are shown schematically in FIG. 9. It can be seen most clearly from FIG. 9 (but also from FIG. 1) that the wedge members 37 are situated such that positioning the cradle 53 at its left hand position enables the right hand side of a connector held by the cradle to be opened by the wedge members, and vice versa. In FIG. 9, the aperture 83 (through which an optical fibre 9 is inserted for cleaving) is clearly spaced from the cradle 53, to allow insertion of a fibre into the aperture. This is one preferred arrangement. In FIG. 1, the arrangement is such that part of the cradle overlaps the aperture 83 when in its extreme left (or right) hand position, and insertion of an optical fibre 9 into the aperture 83 is enabled by the provision of a slot 84 in the cradle. This is an alternative preferred arrangement.

Figure 4:
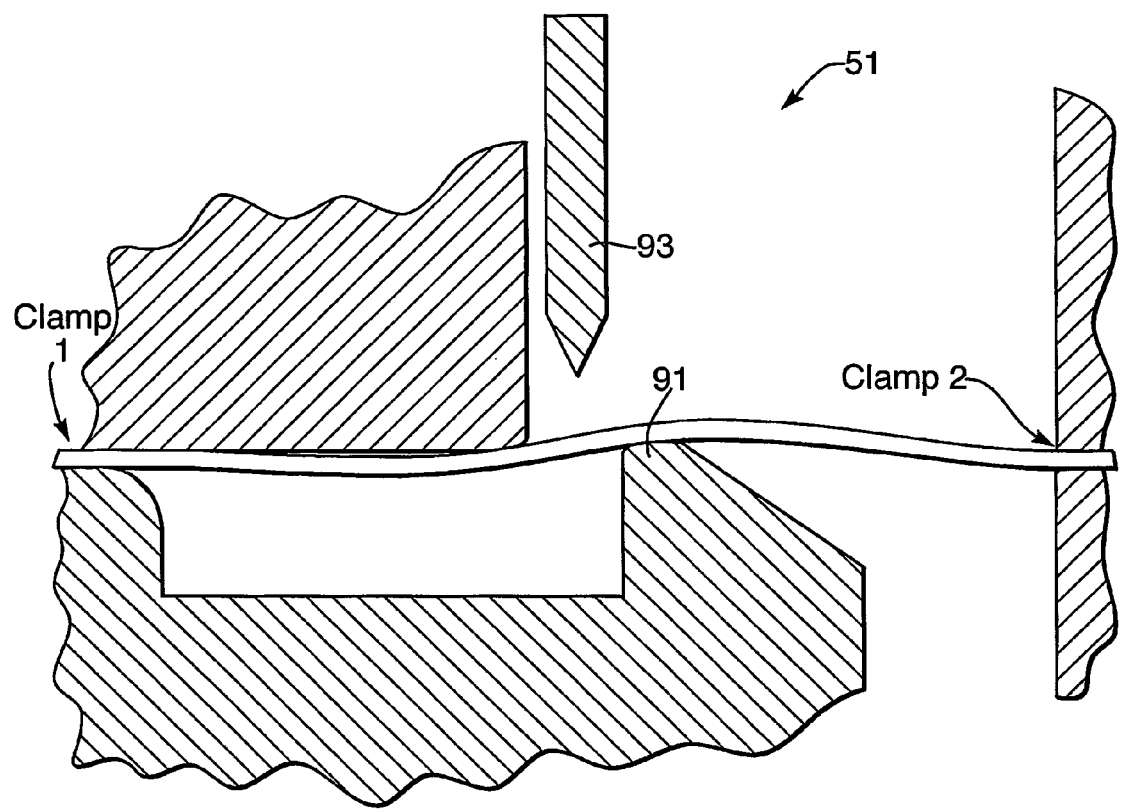
FIG. 4 is another cross-sectional illustration of a detail of the cleaving mechanism of FIG. 3.
Figure 5:
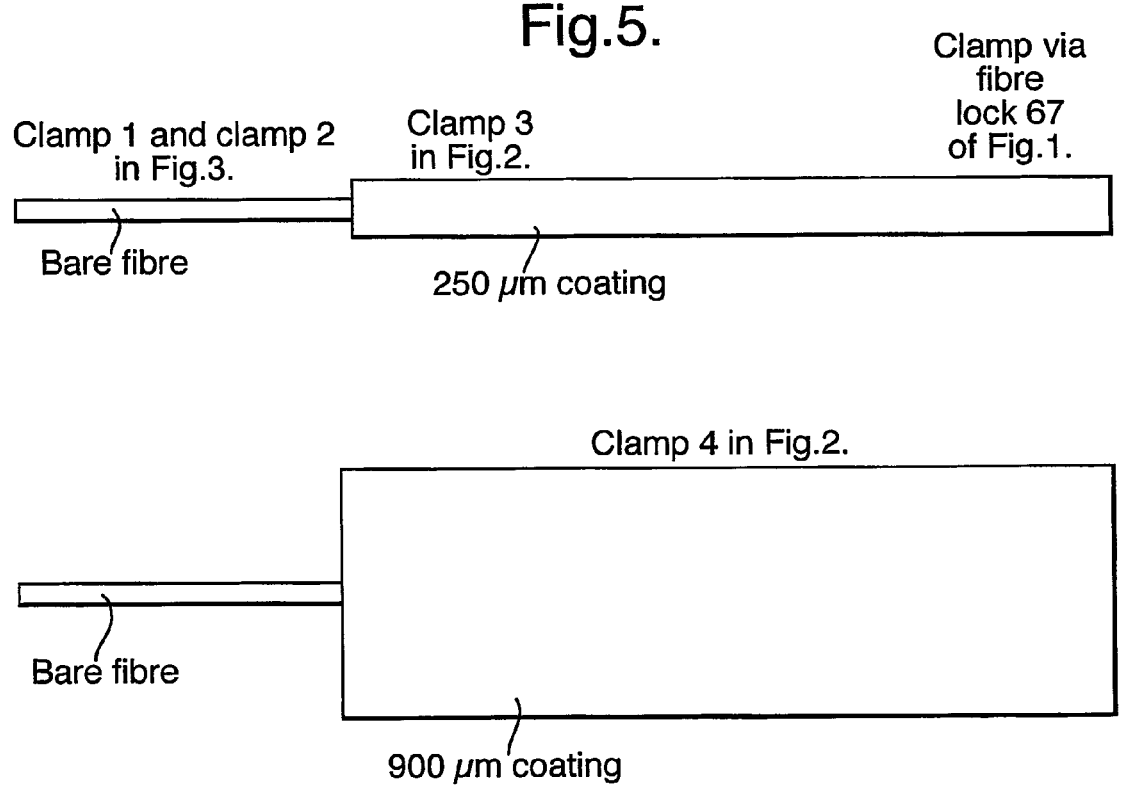
FIG. 5 is a schematic illustration showing the clamping points of an optical fibre being cleaved by a device according to the invention.

Now, if an optical fibre is to be cleaved and the end of the fibre then installed in the connector 1 held in the cradle 53, the button 79 is pressed once more (and held depressed), causing a clamping mechanism of the cleaving mechanism to be opened to allow the insertion of the fibre into the cleaving mechanism via an aperture 83 in the main surface 77 of the main body 57 of the device. (The cleaving mechanism is not shown in FIG. 1, but described below with reference to FIGS. 3, 4 and 5.) As mentioned above, an end region of the optical fibre will have had its coating stripped to expose a region of bare optical fibre, and the fibre is inserted into the aperture 83 until the end of the fibre coating (at the end of the stripped bare region of fibre) butts against a stop member of the cleaving mechanism. The button 79 is then released, causing the clamping mechanism of the cleaving mechanism to clamp the inserted optical fibre.

The optical fibre clamped by the cleaving mechanism and extending out of the aperture 83 is then placed in the groove 65 of the support 63 of the insertion mechanism, so that the fibre extends around the circumference of the support. The pivoted fibre lock 67 is then rotated around the circumference of the support from position a towards position b, until the fibre is clamped between the fibre lock 67 and the support 63, and also clamped by the further clamp 69 (which is actuated by the rotation of the fibre lock).

With the optical fibre firmly clamped by both the cleaving mechanism and the insertion mechanism, the fibre may now be cleaved in order to produce an angled end face of the fibre (in preparation for forming a splice with another fibre). The cleaving is carried out by squeezing handle 61 towards handle 59 (i.e. by closing the handles of the device) until the handle

61 reaches a locking position (in which the handles are locked closed). Because the optical fibre was inserted into the cleaving mechanism until the end of fibre coating butted against a stop, the distance between the point of cleavage of the bare fibre (i.e. the end face of the fibre produced by the cleavage) and the end of the coating, is a fixed standard length determined by the dimensions of the cleaving mechanism. Consequently, every fibre cleaved by the device will have a substantially identical end region, having a standard angled end face and a standard length of bare optical fibre extending from the end of the stripped-back coating to the end face. This "standardisation" of the fibre preparation facilitates the standardisation of splices between fibres, and helps to ensure the desired consistency of the splices.

When the handle 61 is locked in its closed position and the fibre cleavage has occurred, the cleaving mechanism releases its hold on the part of the optical fibre that is to be installed in the connector. (The end portion of the fibre that has been cleaved from the main part of the fibre, and which is to be discarded, is still, at this point in the procedure, clamped by the cleaving mechanism.) The closing of the handle 61 has also released the support 63 of the insertion mechanism 55 from being locked in its upright orientation (as drawn in FIG. 1), allowing the support 63 to be moved in order to manipulate the optical fibre and to install it in the connector 1 held in the cradle 53.

The manipulation of the optical fibre by means of the insertion mechanism 55 is achieved by firstly lifting the support 63 on the shafts 75 away from the main surface 77 of the main body 57. This lifting movement unlocks the support 63 further such that it is now able to rotate away from its upright orientation, as indicated by the double-headed arrow C. The support 63 is thus rotated away from the cradle 53 and the connector 1 (i.e. to the right as drawn in FIG. 1, or to the left if the cradle and connector were instead located on the right hand side of the device). The support is rotated towards the opposite side of the device to that of the cradle and connector so that the optical fibre held by the support may be inserted axially into the connector 1 along the bore 7 of the connector. As described earlier, the support 63 is rotated so that it is in a "flat" orientation parallel to the main surface 77 of the main body 57 of the device 50. When the support 63 is in this flat orientation, the fibre 9 held by the support consequently also lies in a plane parallel to the main surface 77. In fact, the arrangement of the device is such that the end portion of the fibre 9 extending from the clamp 69 is coaxial with the bore 7 of the connector 1 held in the cradle 53. Thus, in order to insert the fibre into the connector 1, the support 63 is merely pushed back along the shafts 75 towards the connector. The length of fibre 9 that is inserted into the connector is predetermined, because the support is pushed until it reaches a position in which it locks in place. The support is also resiliently mounted on the shafts 75 so that, if there is another optical fibre already installed in the connector 1, the newly inserted fibre is pushed against the end of the pre-installed fibre by a pre-set insertion force, to ensure that there is an intimate contact between the end faces of the two optical fibres and a low optical loss splice is therefore formed.

It will be recalled that the relevant side of the connector 1 is slightly open to facilitate the insertion of the optical fibre. (This opening of the relevant side of the connector was achieved by tuning the wedge handle 81 to the "open" position, causing the relevant wedge members 37 to prise the connector open, as described earlier.) Now that the optical fibre has been inserted into the relevant side of the connector, that side of the connector may be closed in order to secure the fibre in place in the connector. This is achieved by turning the wedge handle 81 to the "closed" position, which causes the wedge members 37 to be withdrawn from the connector. With the fibre secured in the connector, the fibre may be released from the support 63 of the insertion mechanism, by rotating the fibre lock 67 back to point a.

All that remains now is to return the device components to their starting condition and either to remove the connector from the device or to install another fibre in the (other side) of the connector. Thus, button 79 is pressed in order to open clamp 1 of the clamping mechanism of the cleaving mechanism, thereby releasing the waste end of the fibre cleaved from the main part of the fibre. (The pressing of the button 79 has also released the handle 61 from its closed position.) Subsequently releasing the button causes the clamping mechanism of the cleaving mechanism to return to its default closed (clamping) condition. The support 63 is returned to its upright orientation by firstly sliding it along the shafts 75 away from the cradle 53, then rotating the support and shafts upright, and then pushing the support back down on the shafts to lock it in position.

If another optical fibre is to be installed in the connector (in the other side of the connector, to form a splice with the fibre that has just been installed), the cradle 53 (still containing the connector) is moved to the opposite side of the surface 77 of the device, and the above procedure is repeated. If no other fibre is to be installed in the connector (i.e. if a splice has already been formed by the installation that has just occurred, or if only one fibre is to be installed in the connector, in preparation for splicing at a subsequent time) the connector is removed from the cradle 53, the cradle is moved to the centre of the surface 77, and the handle 61 is moved to its locked closed position. The device is thus now ready for another fibre installation procedure with another connector.

As discussed earlier in this specification, each optical fibre end face produced through cleavage by the cleaving mechanism 51 of the device is angled away from the perpendicular with respect to the longitudinal axis of the fibre. The basis principle of the manner in which the cleaving is carried out preferably is substantially as described in WO 98/54608. A detail of an embodiment of the cleaving mechanism is shown in FIG. 4. This figure shows an optical fibre 9 clamped by two spaced-apart clamps of the cleaving mechanism, labelled "clamp 1" and "clamp 2". The fibre is placed under tension between the two clamps, by slight increasing the distance between the clamps (e.g. by moving one of the clamps away from the other clamp). An anvil 91 displaces the fibre between the clamps so that the fibre is placed under both tension and shear, and a scoring blade 93 then scores the fibre, causing the fibre to cleave at an angle away from the perpendicular to the fibre axis.

Figure 3:
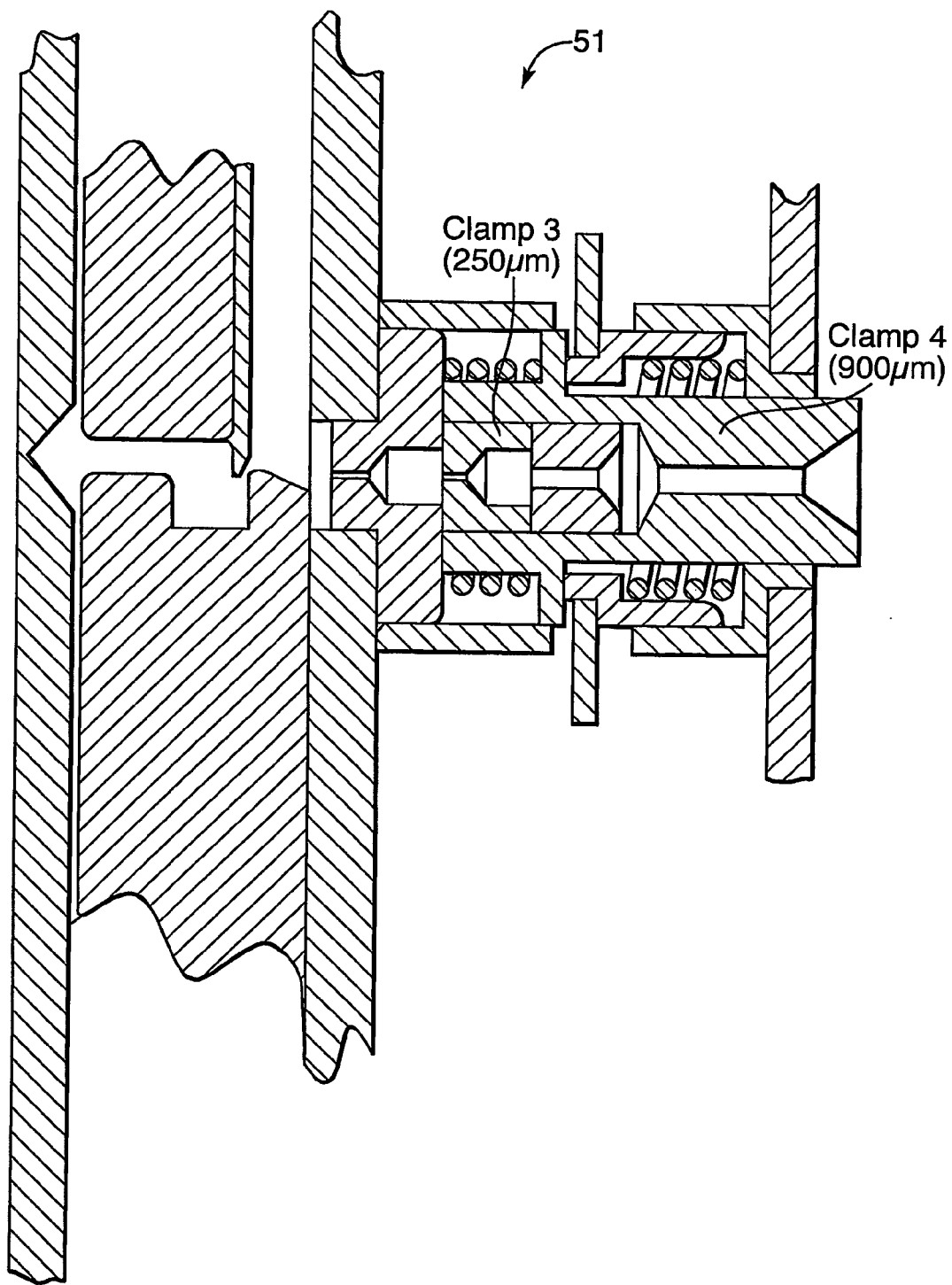
FIG. 3 is a cross-sectional illustration of an embodiment of an optical fibre cleaving mechanism of a device according to the invention.

FIG. 3 shows the whole of the cleaving mechanism 51, comprising the components described in the preceding paragraph, and two further clamps, labelled clamp 3 and clamp 4. Clamps 1 and 2 clamp directly onto the stripped bare optical fibre. Clamp 3 clamps onto the coating of the fibre, for coated fibre having a small diameter (e.g. 250 μm). Clamp 4 clamps onto the coating of the fibre, for fibre having a larger diameter (e.g. 900 μm). That is, either clamp 3 clamps onto the coated fibre, or clamp 4 clamps onto the coated fibre, depending upon the size of the fibre used. The positions of these clamps with respect to the 250 μm and 900 μm fibres are shown schematically in FIG. 5.

The relative orientations of the clamping mechanism, the installation mechanism and the connector holding means of the device are critically important for those embodiments of the invention (as described above) in which the cleaving mechanism produces an angled fibre end face. In order for a low optical loss splice to be achieved between two fibres having angled end faces, the two fibres need to be coaxial, with their end faces facing each other and 180° opposed (around a rotational axis comprising the longitudinal axis of the fibres). This is illustrated schematically in FIG. 6. In order to achieve this, the cleavage plane needs to be perpendicular to the bore 7 of the connector 1, when the connector is held in the holding means (cradle) 53. The 180° opposition of the two fibres to be spliced is achieved by the installation mechanism. A first of the fibres is rotated by the installation mechanism from the upright cleaving orientation through 90° to an installation orientation. The second of the two fibres is rotated by the installation mechanism from the upright cleaving orientation through 90° in the opposite direction, to its (opposite) installation orientation. Consequently, the angled end faces of the two fibres are 180° opposed to each other, as shown in FIG. 6.

The device according to the invention preferably has several advantageous additional features, including the following. Preferably the device is a hand operated (and preferably hand held) tool. The device may be powered and/or automated (e.g. by electricity) but is preferably operated entirely manually. Although the device may be hand held, it preferably includes attachment means by which it may be attached to a "network element", i.e. an item of an optical communications network, for example a cable splice closure or a cabinet. The device preferably is maintenance-free, and disposable once it has performed a predetermined number of fibre installations. This is consistent with a purpose of the invention being to provide an installation device that avoids the need for a significant level of skill on the part of the operator of the device. As described earlier, the cleaving mechanism preferably is located within the main body of the device, and accessible by an optical fibre only by insertion of the fibre through an aperture in the device. The cleaving mechanism preferably is not accessible to the operator (other than for insertion of a fibre). Consequently, the cleaving mechanism preferably is not accessible for maintenance or for the replacement of a scoring blade, for example. Instead, it is preferred for the scoring blade of the cleaving mechanism to be "indexed" so that it presents a new part of the blade for scoring a fibre, for each fibre or set of fibres that is/are cleaved. This has the advantage of providing consistency without the need for maintenance of the device.

The device of this invention may readily be adapted for use with the non-wedged splice assemblies described and claimed in our co-pending UK Patent Application 0412003.6 (B447), the entire disclosure of which is incorporated herein by reference. For such use, the wedge members hereinbefore described may be replaced by blunt-ended "pusher" members adapted to exert the necessary squeezing action on appropriate parts of the connector body to push the clamping parts of the connector body away from each other, without any wedging action.

The invention claimed is:

1. A device for installing an optical fiber in a connector, comprising:
   an optical fiber cleaving mechanism having a cleavage orientation having a first axis;
   means for holding an optical fiber connector; and
   a fiber insertion mechanism having a fiber insertion orientation having a second axis, where the first and second axes are substantially perpendicular;
   the fiber insertion mechanism being arranged such that an optical fiber may be cleaved by the cleaving mechanism to produce an end of the fiber, and the end of the fiber may be inserted by means of the insertion mechanism into a connector held by the connector holding means, wherein the insertion mechanism rotates the end of the fiber between the cleavage orientation and the insertion orientation with respect to the connector holder, in order to insert the fiber into the connector, the rotation of the fiber by the insertion mechanism being through substantially 90 degrees.

2. A device according to claim 1, wherein the end of the fiber is inserted into the connector in a predetermined orientation with respect to the connector.

3. A device according to claim 1, wherein the cleaving mechanism is arranged to cleave the optical fiber such that an end face of the end of the fiber so produced is oriented at a non-perpendicular angle with respect to the longitudinal axis of the fiber.

4. A device according to claim 3, wherein the insertion of the fiber into the connector by the insertion mechanism is such that the orientation of the non-perpendicular end face of the fiber with respect to the connector is predetermined.

5. A device according to claim 1, comprising a main body within which the cleaving mechanism is located.

6. A device according to claim 5, wherein the cleaving mechanism may be accessed by an optical fiber to be cleaved, only by insertion of the fiber through an aperture in the main body.

7. A device according to claim 1, wherein the insertion mechanism manipulates the fiber in order to insert the end of the fiber in the connector.

8. A device according to claim 7, wherein the insertion mechanism moves the cleaved end of the fiber with respect to the connector holder in a direction along a longitudinal axis of the fiber, which axis extends from the cleaved end of the fiber, in order to insert the fiber in a connector.

9. A device according to claim 8, wherein the axial movement of the fiber by the insertion mechanism comprises movement of the insertion mechanism to a locking position at which the fiber is fully inserted into the connector.

10. A device according to claim 9, wherein, when the insertion mechanism is in its locking position, the insertion mechanism resists removal of the fiber out of the connector, and resilient means of the insertion mechanism applies an insertion force to the fiber.

11. A device according to claim 1, wherein the insertion mechanism comprises a curved support on which the fiber is retained when the end of the fiber is inserted into the connector.

12. A device according to claim 11, wherein the curved support comprises an at least partial disc, on the circumference of which the fiber is retained.

13. A device according to claim 1, wherein the insertion mechanism clamps the fiber during the cleavage of the fiber.

14. A device according to claim 13, wherein the clamping of the fiber by the insertion mechanism is maintained subsequent to the cleavage of the fiber, until the fiber has been inserted into the connector.

15. A device according to claim 13, wherein the curved support comprises an at least partial disc, on the circumference of which the fiber is retained, and wherein the clamping and retention of the fiber on the support is achieved by rotating a pivoted fiber lock member of the at least partial disc of the support around at least part of the circumference thereof.

16. A device according to claim 15, wherein the rotation of the fiber lock member traps the fiber in a groove in the circumference of the support, the groove decreasing in depth along the circumference in the direction of rotation of the fiber lock member.

17. A device according to claim 1, wherein the connector holding means comprises a cradle for a connector, which is movable with respect to the remainder of the device.

18. A device according to claim 17, further comprising a main body within which the cleaving mechanism is located, wherein the cradle is movable across the main body of the device between two opposite insertion positions, and wherein optical fibers may be inserted into respective opposite ends of a connector held by the cradle to form an optical fiber splice in the connector.

19. A device according to claim 18, wherein the insertion mechanism rotates the end of the fiber between a cleavage orientation and an insertion orientation with respect to the connector holder, in order to insert the fiber into the connector, and wherein there are two opposite insertion orientations of the insertion mechanism, the insertion mechanism being situated on opposite sides of its cleavage orientation, the opposite insertion orientations being for inserting fibers into a connector located respectively in the two opposite insertion positions of the cradle.

20. A device according to claim 3, wherein the cleaving mechanism is arranged to produce the non-perpendicular end face of the fiber such that the end face lies in a plane substantially perpendicular to a direction of insertion of the fiber into a connector held by the connector holding means.

21. A device according to claim 20, wherein the insertion mechanism rotates the end of the fiber between a cleavage orientation and an insertion orientation with respect to the connector holder, in order to insert the fiber into the connector, and wherein there are two opposite insertion orientations of the insertion mechanism, the insertion mechanism is situated on opposite sides of its cleavage orientation, the opposite insertion orientations being for inserting fibers into a connector located respectively in the two opposite insertion positions of the cradle, and the non-perpendicular end faces of two fibers spliced in the connector are 180 degrees opposed, around a rotational axis comprising the longitudinal axis of the fibers.

22. A device according to claim 1, further comprising one or more wedge members that are movable with respect to the connector holding means to open a connector held by the holding means, to enable the insertion of an optical fiber therein.

23. A device according to claim 22, further comprising a main body within which the cleaving mechanism is located, wherein the cradle is movable across the main body of the device between two opposite insertion positions, and wherein optical fibers may be inserted into respective opposite ends of a connector held by the cradle to form an optical fiber splice in the connector, and further comprising one or more wedge members located adjacent to each insertion position of the cradle, arranged to open respective parts only of a connector held by the cradle, to allow the insertion of an optical fiber into respective opposite ends of the connector.

24. A device according to claim 1, further comprising at least one handle which, when moved to an actuation position causes the cleaving mechanism to cleave an optical fiber.

25. A device according to claim 1, comprising a hand operated tool.

26. The use of a device according to claim 1, to install an optical fiber in an optical fiber connector.

27. The use according to claim 26, wherein the connector comprises at least two parts between which the optical fiber is inserted by the insertion mechanism of the device.

28. The use according to claim 27, further comprising one or more wedge members that are movable with respect to the connector holding means to open a connector held by the holding means, to enable the insertion of an optical fiber therein, wherein the parts of the connector are opened by the wedge member(s), thereby enabling the insertion of the optical fiber into the connector.

29. The use according to claim 28, wherein the connector, and the wedge members and the connector holding means of the device, are arranged such that the wedge members open only a portion of the connector at a time, to install an optical fiber in that portion of the connector while leaving another portion of the connector unopened.

30. A device for installing an optical fiber in a connector, comprising:
an optical fiber cleaving mechanism;
a connector holding means; and
a fiber insertion mechanism;
arranged such that an optical fiber may be cleaved by the cleaving mechanism to produce an end of the fiber, and the end of the fiber may be inserted by means of the insertion mechanism into a connector held by the connector holding means, and wherein the insertion mechanism comprises a curved support on which the fiber is retained when the end of the fiber is inserted into the connector, the curved support comprising an at least partial disc, on the circumference of which the fiber is retained, and wherein the clamping and retention of the fiber on the support is achieved by rotating a pivoting fiber lock member of the at least partial disc of the support around at least part of the circumference thereof.

31. A device according to claim 30, wherein the curved support comprises an at least partial disc, on the circumference of which the fiber is retained.

32. A device according to claim 30, wherein the insertion mechanism clamps the fiber during the cleavage of the fiber.

33. A device according to claim 32, wherein the clamping of the fiber by the insertion mechanism is maintained subsequent to the cleavage of the fiber, until the fiber has been inserted into the connector.

34. A device according to claim 30, wherein the rotation of the fiber lock member traps the fiber in a groove in the circumference of the support, the groove decreasing in depth along the circumference in the direction of rotation of the fiber lock member.

35. A device for installing an optical fiber in a connector, comprising:
an optical fiber cleaving mechanism;
a connector holding means;
a fiber insertion mechanism; and
one or more wedge members configured to open a connector held by the holding means to enable the insertion of an optical fiber therein, the connector holding means being movable in a lateral direction relative to the one or more wedge members;
arranged such that an optical fiber may be cleaved by the cleaving mechanism to produce an end of the fiber, and the end of the fiber may be inserted by means of the insertion mechanism into a connector held by the connector holding means.

36. A device according to claim 35, further comprising a main body within which the cleaving mechanism is located, wherein the cradle is movable across the main body of the device between two opposite insertion positions, and wherein optical fibers may be inserted into respective opposite ends of a connector held by the cradle to form an optical fiber splice in the connector, and further comprising one or more wedge members located adjacent to each insertion position of the cradle, arranged to open respective parts only of a connector held by the cradle, to allow the insertion of an optical fiber into respective opposite ends of the connector.

37. The device of claim 35, wherein the wedge members include a first wedge member and a second wedge member, the first wedge member is configured to open a first portion of the connector for insertion of a first optical fiber therein, and the second wedge member is configured to open a second portion of the connector for insertion of a second optical fiber therein, the second wedge member is spaced apart from the connector when the first wedge member is engaged with the first portion of the connector, and the first wedge member is spaced apart from the connector when the second wedge member is engaged with the second portion of the connector.

* * * * *